US011801921B2

(12) United States Patent
Cameron

(10) Patent No.: US 11,801,921 B2
(45) Date of Patent: Oct. 31, 2023

(54) MOTORIZED FLOATING PICNIC TABLE

(71) Applicant: Lon R. Cameron, Winthrop, ME (US)

(72) Inventor: Lon R. Cameron, Winthrop, ME (US)

(73) Assignee: Maine Float LLC, Winthrop, ME (US)

( * ) Notice: Subject to any disclaimer, the term of this patent is extended or adjusted under 35 U.S.C. 154(b) by 260 days.

(21) Appl. No.: 17/448,231

(22) Filed: Sep. 21, 2021

(65) Prior Publication Data

US 2023/0091754 A1    Mar. 23, 2023

(51) Int. Cl.
*B63B 35/34*    (2006.01)
*B63H 20/00*    (2006.01)
*B63B 59/02*    (2006.01)
*B63B 21/04*    (2006.01)
*B63H 20/02*    (2006.01)
*B63B 41/00*    (2006.01)
*B63B 17/02*    (2006.01)
*B60L 50/60*    (2019.01)

(52) U.S. Cl.
CPC ............. *B63B 35/34* (2013.01); *B60L 50/66* (2019.02); *B63B 17/02* (2013.01); *B63B 21/04* (2013.01); *B63B 41/00* (2013.01); *B63B 59/02* (2013.01); *B63H 20/007* (2013.01); *B63H 20/02* (2013.01)

(58) Field of Classification Search
CPC ......... B63B 17/00; B63B 17/02; B63B 35/00; B63B 35/34; B63B 21/00; B63B 21/04; B63B 41/00; B63B 59/00; B63B 59/02; B60L 50/66; B63H 20/00; B63H 20/007; B63H 20/02

USPC .............................................. 440/6
See application file for complete search history.

(56) References Cited

U.S. PATENT DOCUMENTS

| 4,358,866 | A | 11/1982 | Rhodes |
| 4,367,689 | A * | 1/1983 | Lukehart ................ B63B 34/52 440/6 |
| 6,139,382 | A | 10/2000 | Eschbacher et al. |
| 6,171,160 | B1 | 1/2001 | Skaggs et al. |
| 6,637,349 | B1 | 10/2003 | Lafferty |
| 6,878,026 | B2 | 4/2005 | Cloutier |
| D592,268 | S | 5/2009 | Montagnino |
| 7,975,327 | B2 | 7/2011 | Switzer |
| 8,047,886 | B1 * | 11/2011 | McLarty .............. B63H 20/007 441/67 |
| 8,506,010 | B2 | 8/2013 | Kane |
| 9,302,740 | B2 | 4/2016 | O'Neal et al. |
| 9,914,507 | B2 | 3/2018 | Falahee |
| 9,975,610 | B2 | 5/2018 | Geum |
| 10,414,137 | B2 | 9/2019 | Eichhorn et al. |
| 10,624,479 | B2 | 4/2020 | Thomas |
| 2005/0039639 | A1 | 2/2005 | Espenschied |

(Continued)

Primary Examiner — Lars A Olson
(74) Attorney, Agent, or Firm — Verrill Dana, LLP; Robert L. Hover

(57) ABSTRACT

A floating motorized picnic table includes a floatation device; a base; benches attached to the base; tabletop supports; a tabletop attached to the tabletop supports; a motor; and a battery electrically connected to the motor. The base frames and rests upon the floatation device. The benches include bench boards attached above and parallel to the floatation device. The tabletop supports are attached between the benches. The tabletop includes top boards. The battery is mounted on the base under the top boards. The motor is mounted at one end with a retractable keel located adjacent to the opposite end.

10 Claims, 4 Drawing Sheets

(56) References Cited

U.S. PATENT DOCUMENTS

2014/0110413 A1 4/2014 Kelly et al.
2015/0000571 A1 1/2015 Stemen

* cited by examiner

MOTORIZED FLOATING PICNIC TABLE

BACKGROUND OF THE INVENTION

The present invention relates to motorized picnic tables and, more particularly, to a motorized floating picnic table.

Most motorized picnic tables currently seen for sale involve no motor or use gas and/or oil combustion. No picnic table is available for use on open water. Gas or combo gas motor systems are loud, produce emissions, and limit the enjoyability of a picnic table floating craft.

As can be seen, there is a need for a quiet, emission-free motorized floating picnic table, specifically with improved steering design given the broad base a picnic table craft has on open water.

SUMMARY OF THE INVENTION

The present invention combines the peace of an electronic motor with floating picnic table construction for a quiet open water experience and rechargeable, motorized, open water enjoyment. The picnic table may be used in an open water capacity for transportation of people and goods and as a pleasure craft.

In one aspect of the present invention, a floating motorized picnic table having a longitudinal axis is provided, comprising: a floatation device; a base configured to frame and rest upon the floatation device; benches comprising bench boards attached to the base above and parallel to the floatation device; tabletop supports attached to the base between the benches; a tabletop comprising top boards attached to the tabletop supports; a motor mounted on a first end of the longitudinal axis; a retractable keel hingedly mounted adjacent a second end of the longitudinal axis opposite the motor; and a battery mounted on the base under the top boards, wherein the battery is electrically connected to the motor.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a floating picnic table comprising a retractable keel, an electric trolling motor, and a deep cycle battery system. The picnic table may be built over molded dock float boxes. The electric motor and battery system combined with the retractable keel maximizes efficiency and movement The picnic table may have a picnic tabletop and benches constructed from framing lumber. For example, several 2×4 s, 16" on center, may be used.

The picnic table is constructed on a floatation device which may be selected from the group consisting of: one or more float boxes; one or more pontoons; and combinations thereof. The floatation device may be manufactured of any suitable material, such as polyethylene for float boxes and metal or wood for pontoons.

The floating picnic table may move through the water powered by an electric trolling motor, preferably mounted at the bow so that the operator may see impediments in the water. A deep cycle battery may be mounted at the table center under the tabletop and connected to the trolling motor. A manually operated drop-down centerboard, or keel, at the stern, raised and lowered by a pull rope mechanism, may improve steering of the craft in open water. The motor and battery may be mounted to the table with mounting hardware and brackets.

An umbrella may be mounted at the table center to provide shade while on open water.

In some embodiments, the picnic table further comprises accessories selected from the group consisting of: recessed cup holders, swim ladders, lighting products, solar products, and combinations thereof. These accessories may improve enjoyment of the picnic table.

In some embodiments, a gas or combo gas combustion engine may be mounted to the picnic table.

A person may use the invention for pleasure, for property rental, or for business rental to enable quiet socialization and propulsion using a picnic table on open water.

Figure 1:
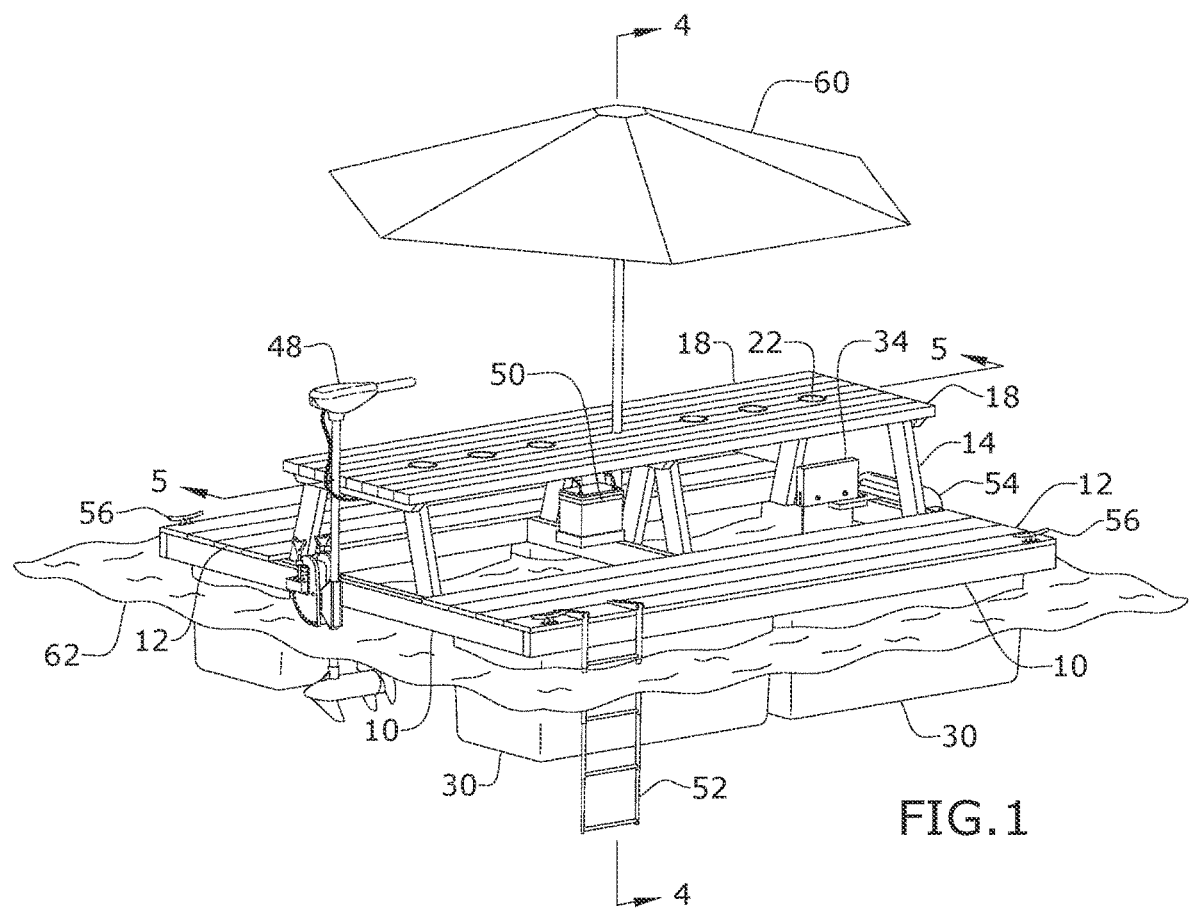
FIG. 1 is a perspective view of a motorized floating picnic table according to an embodiment of the present invention, shown in use.

Referring to FIGS. 1 through 7, a floating motorized picnic table including a tabletop and benches is shown on water 62 in FIG. 1. Cleats 56 installed on bench board 12 enable the picnic table to be secured in place. An umbrella 60 is shown deployed over a center of the table and a telescoping ladder 52 is shown mounted to a side of the bench board 12.

Figure 2:
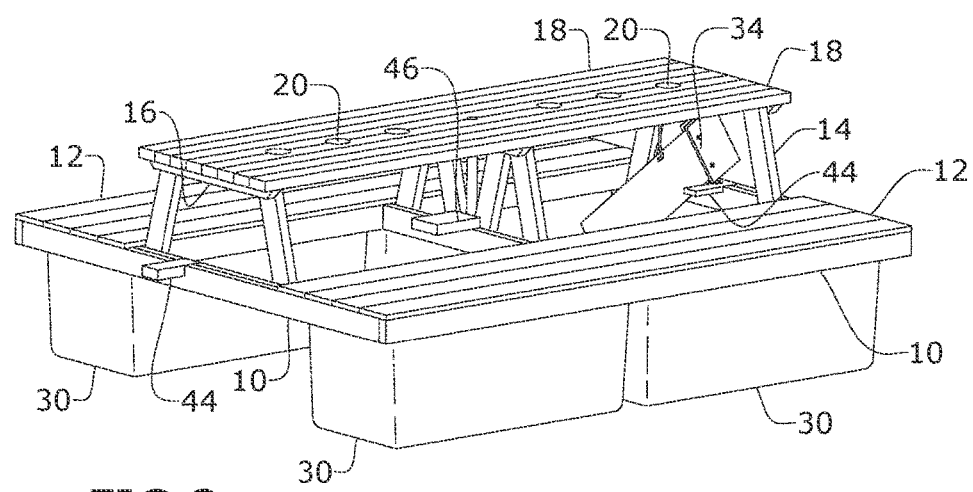
FIG. 2 is another perspective view thereof.

FIG. 2 illustrates the bench board 12 and top supports 14 mounted on base framing 10 which is shown built on float boxes 30. Top boards 18 are shown mounted on the top supports 14 to form the tabletop.

Figure 3:
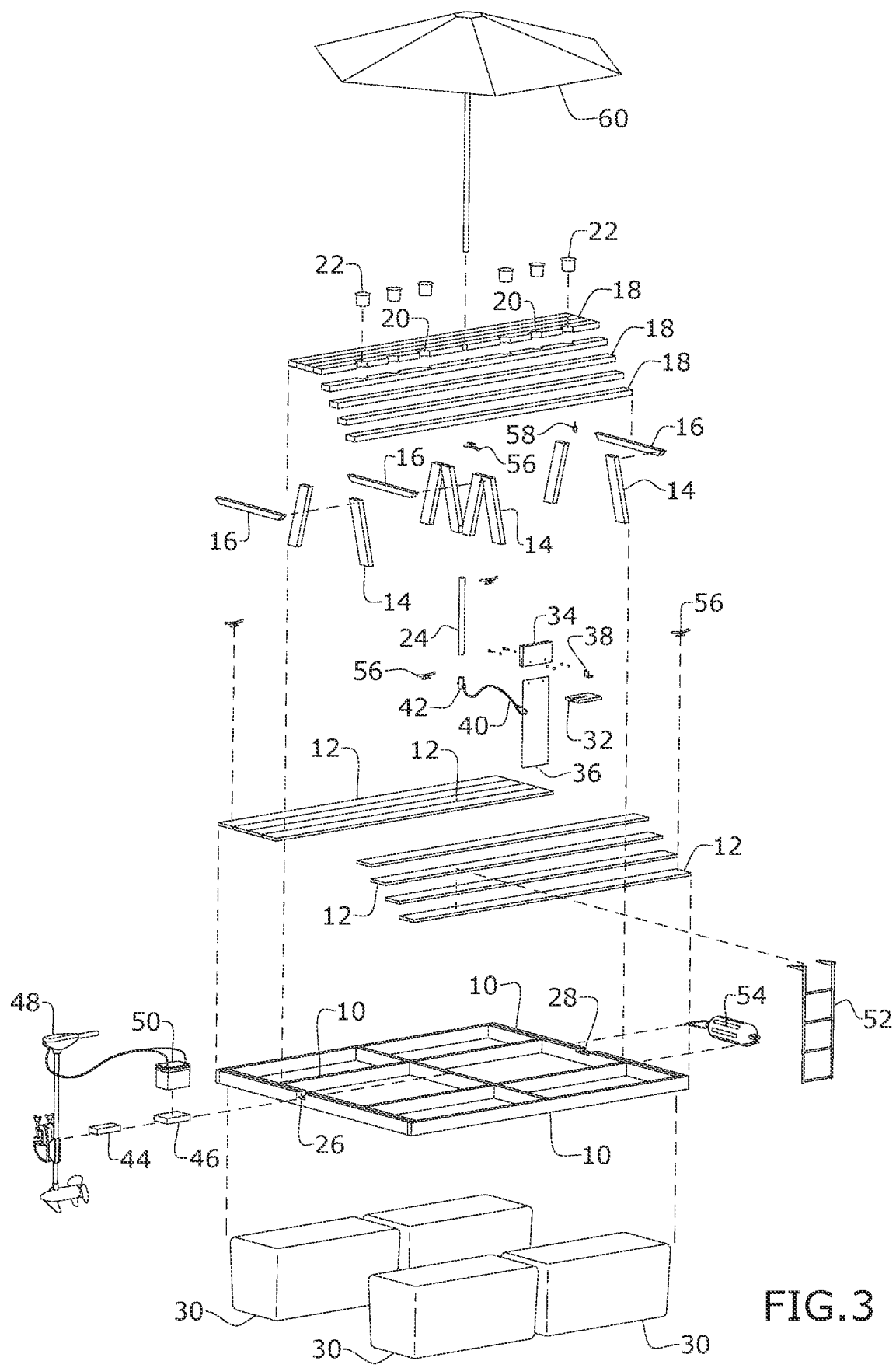
FIG. 3 is an exploded view thereof.
Figure 4:
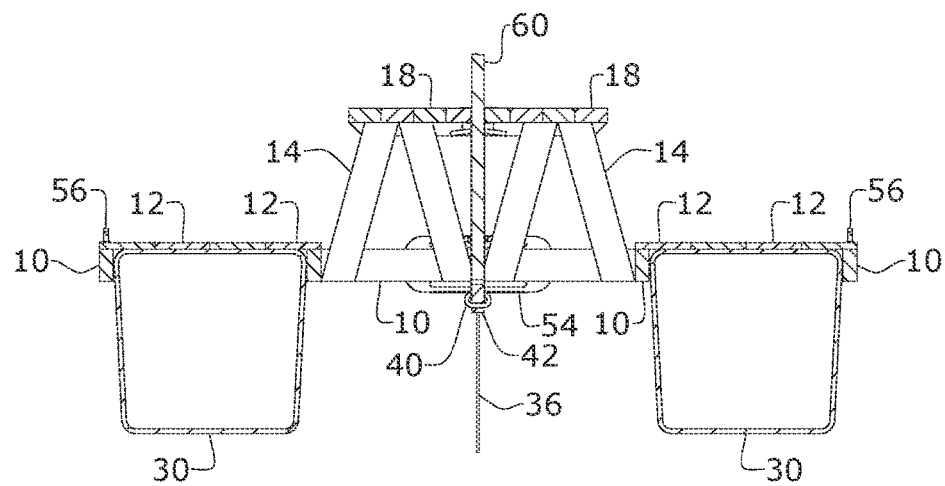
FIG. 4 is a sectional view thereof, taken along line 4-4 from FIG. 1.

As FIG. 3 shows, the base framing 10 has a cutout 26, 28 at each upper end to accommodate connections.

Figure 5:
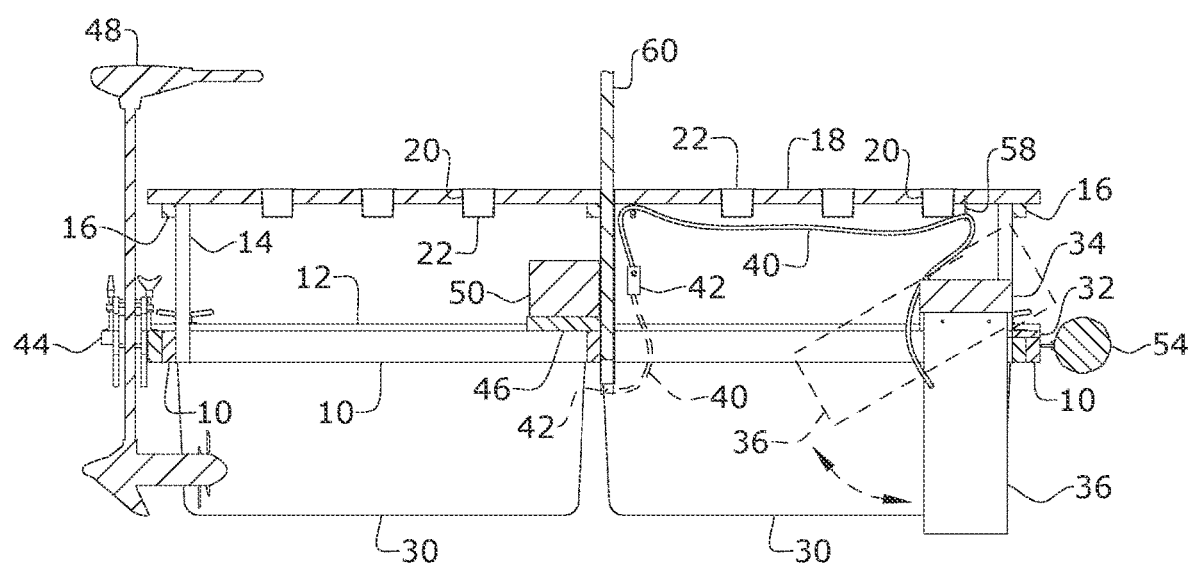
FIG. 5 is a sectional view thereof, taken along line 5-5 from FIG. 1.

FIG. 5 illustrates a retractable keel 36 hinge-mounted adjacent to a buoy 54 at an edge of the table. The keel 36 extends from a keel holder 34 mounted on a keel mounting board 32 with a hinge 38. A rope 40 extends from a plug 42 (see FIG. 6) and loops through an eyebolt 58 installed beneath the top boards 18 to attach to the keel 36. A battery 50 rests on a board 46 mounted on the base framing adjacent to the umbrella 60.

Figure 6:
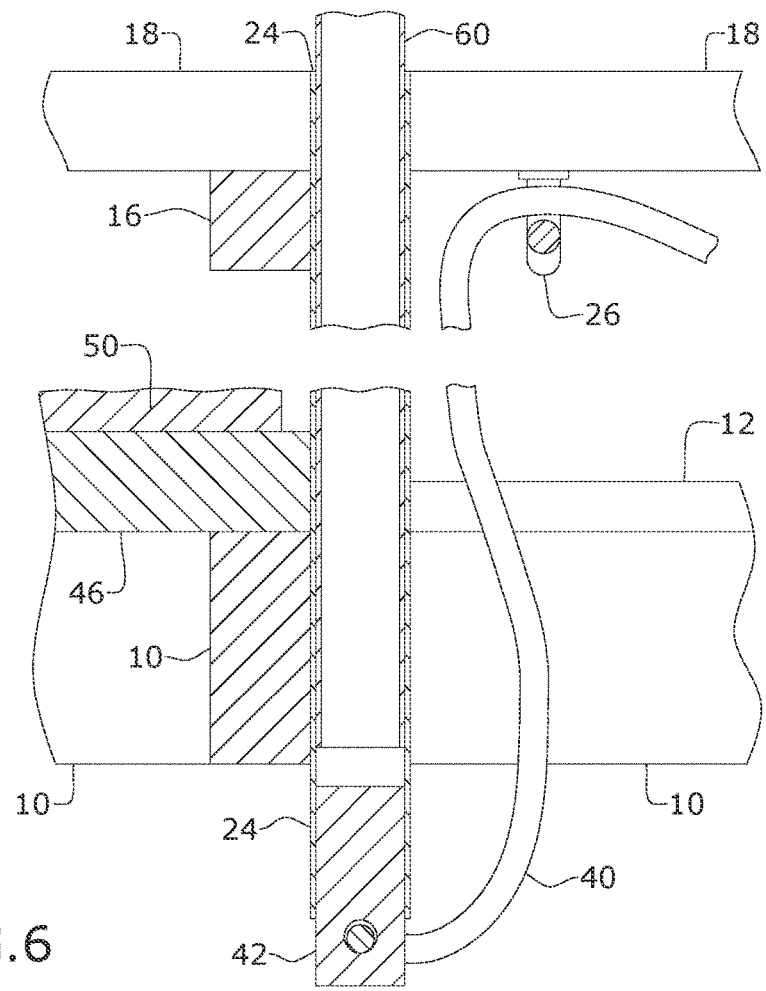
FIG. 6 is an enlarged detail sectional view thereof.

FIG. 6 shows a tube 24 supporting the umbrella 60 with the plug 42 beneath.

Figure 7:
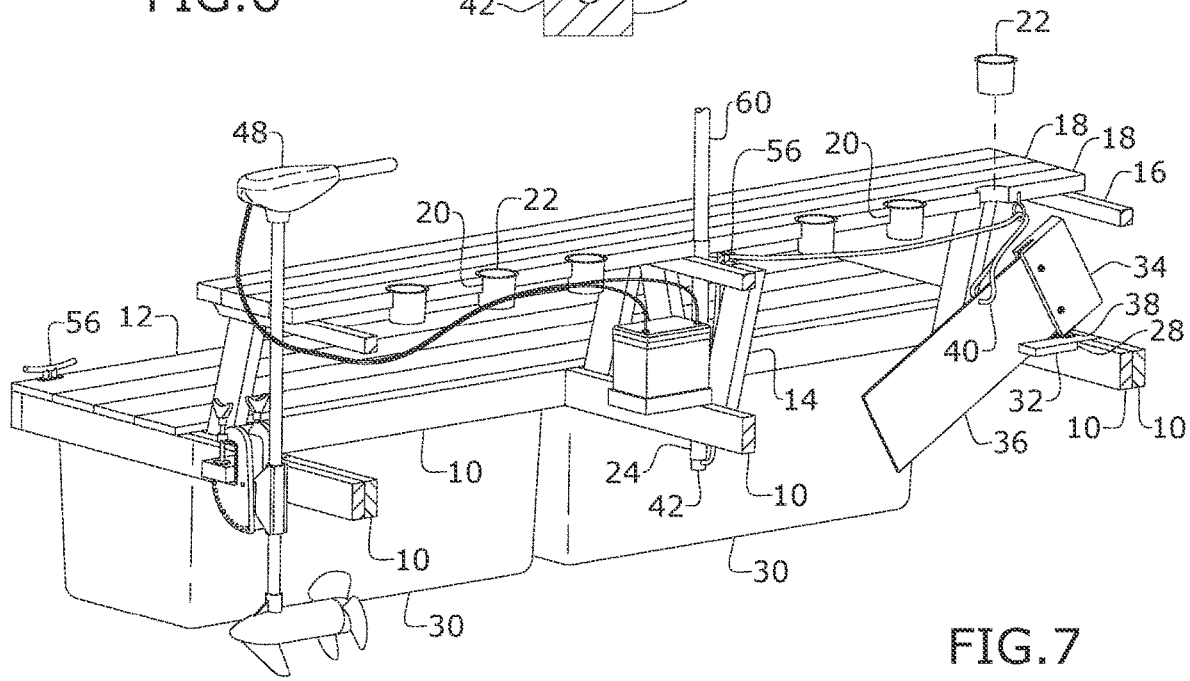
FIG. 7 is a partial perspective view thereof, showing the center of the table.

As shown best in FIG. 7, a motor 48 is mounted to a board 44 (see FIG. 2) on a first end of a longitudinal axis, the dock fender/buoy 54 is mounted at a second end of the longitudinal axis (see FIG. 5), the keel 36 is mounted proximate to the buoy 54, and the battery 50 is mounted therebetween under the top boards 18. Top cross members 16 perpendicularly support the top boards 18 and cup openings 20 within the top boards 18 support cups 22.

It should be understood, of course, that the foregoing relates to exemplary embodiments of the invention and that modifications may be made without departing from the spirit and scope of the invention as set forth in the following claims.

What is claimed is:

1. A floating motorized picnic table having a longitudinal axis, comprising:
   a) a floatation device;
   b) a base configured to frame and rest upon the floatation device;
   c) benches comprising bench boards attached to the base above and parallel to the floatation device;
   d) tabletop supports attached to the base between the benches;
   e) a tabletop comprising top boards attached to the tabletop supports;
   f) a motor mounted on a first end of the longitudinal axis;
   g) a retractable keel hingedly mounted adjacent a second end of the longitudinal axis opposite the motor; and
   h) a battery mounted on the base under the top boards, wherein the battery is electrically connected to the motor.

2. The floating motorized picnic table of claim 1, wherein at least one of the top boards has cup holder openings therein.

3. The floating motorized picnic table of claim 1, further comprising an umbrella removably installed at a center of the tabletop.

4. The floating motorized picnic table of claim 1, further comprising cleats installed on each of the benches.

5. The floating motorized picnic table of claim 1, further comprising a telescoping ladder mounted to a side of the bench boards.

6. The floating motorized picnic table of claim 1, wherein the motor is an electric trolling motor.

7. The floating motorized picnic table of claim 1, wherein the battery is a deep cycle battery.

8. The floating motorized picnic table of claim 1, wherein the floatation device is selected from the group consisting of: one or more float box; one or more pontoon; and combinations thereof.

9. The floating motorized picnic table of claim 1, further comprising a dock fender mounted at a second end of the longitudinal axis, wherein the battery is mounted between the motor and the retractable keel, and the base has a concavity at the first end and the second end.

10. The floating motorized picnic table of claim 2, wherein the retractable keel is attached to a rope operative to raise and lower the retractable keel.

* * * * *